US008690450B2

(12) United States Patent
Itou et al.

(10) Patent No.: US 8,690,450 B2
(45) Date of Patent: Apr. 8, 2014

(54) MACHINE COMPONENT AND SUPER-FINISHING METHOD THEREFOR

(75) Inventors: Gousuke Itou, Iwata (JP); Satoshi Fujimoto, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/067,572

(22) Filed: Jun. 9, 2011

(65) Prior Publication Data

US 2011/0243489 A1   Oct. 6, 2011

Related U.S. Application Data

(63) Continuation of application No. PCT/JP2009/006681, filed on Dec. 8, 2009.

(30) Foreign Application Priority Data

Dec. 15, 2008   (JP) ................................. 2008-318108

(51) Int. Cl.
| | |
|---|---|
| *F16C 33/00* | (2006.01) |
| *F16C 33/34* | (2006.01) |
| *F16C 33/58* | (2006.01) |
| *B23P 17/00* | (2006.01) |
| *B24B 1/00* | (2006.01) |

(52) U.S. Cl.
USPC ...... 384/565; 384/569; 384/625; 29/898.066; 29/898.068; 451/52

(58) Field of Classification Search
USPC .................... 29/898, 898.02, 898.03, 898.04, 29/898.041, 898.042, 898.066, 898.068, 29/898.069, 898.13; 384/548, 569, 625, 384/565; 451/51, 52, 49
See application file for complete search history.

(56) References Cited

U.S. PATENT DOCUMENTS

| | | | |
|---|---|---|---|
| 6,767,134 B2 | 7/2004 | Murai et al. | |
| 6,994,610 B1 | 2/2006 | Aiura et al. | |
| 7,150,565 B1 * | 12/2006 | Koyama et al. | ............... 384/450 |
| 7,797,829 B2 | 9/2010 | Yamada et al. | |

(Continued)

FOREIGN PATENT DOCUMENTS

| | | |
|---|---|---|
| CH | 204937 | 5/1939 |
| CN | 1396392 | 2/2003 |

(Continued)

OTHER PUBLICATIONS

English Translation of the International Preliminary Report on Patentability mailed Jul. 14, 2011 in corresponding International Patent Application PCT/JP2009/006681.

(Continued)

*Primary Examiner* — Phillip A Johnson

(57) ABSTRACT

A surface shape of a machining surface of a rotating elastic grindstone is rendered to be a shape appropriate to a to-be-machined surface of a work. With the work being rotated, the rotating elastic grindstone is held in engagement to an end of the to-be-machined surface of the work. The elastic grindstone is moved along a machining trajectory effective to allow the machining surface of the elastic grindstone, which is so formed as to suit to the to-be-machined surface, to follow the to-be-machined surface of the work. The to-be-machined surface of the work so superfinished represents a smooth surface free from any machining trace such as a crossing-angle pattern.

13 Claims, 7 Drawing Sheets

(56) References Cited

U.S. PATENT DOCUMENTS

| | | | |
|---|---|---|---|
| 8,062,097 B2 | 11/2011 | Clewes et al. | |
| 2003/0012477 A1* | 1/2003 | Murai et al. | 384/569 |
| 2004/0264825 A1* | 12/2004 | Kamamura et al. | 384/568 |
| 2006/0065518 A1 | 3/2006 | Aiura et al. | |
| 2006/0081126 A1* | 4/2006 | Yamada et al. | 92/248 |
| 2007/0099548 A1 | 5/2007 | Kumar et al. | |

FOREIGN PATENT DOCUMENTS

| | | |
|---|---|---|
| CN | 1535795 | 10/2004 |
| CN | 1764776 | 4/2006 |
| DE | 102004017541 A1 | 11/2004 |
| JP | 57-138565 | 8/1982 |
| JP | 03-142004 | 6/1991 |
| JP | 4-5366 | 1/1992 |
| JP | 5-69309 | 3/1993 |
| JP | 11-138350 | 5/1999 |
| JP | 2002-11650 | 1/2002 |
| JP | 2004-174641 | 6/2004 |
| JP | 2004-257290 | 9/2004 |
| JP | 2004-322307 | 11/2004 |
| JP | 2004-330362 | 11/2004 |
| JP | 2005-118926 | 5/2005 |
| JP | 2007-155021 | 6/2007 |
| JP | 2007-162893 | 6/2007 |
| JP | 2007-168055 | 7/2007 |
| JP | 2007-260829 | 10/2007 |
| JP | 2007-260830 | 10/2007 |
| JP | 2007-333161 | 12/2007 |
| JP | 2009-190097 | 8/2009 |
| JP | 2009-202277 | 9/2009 |

OTHER PUBLICATIONS

International Search Report mailed Jan. 12, 2010 in corresponding International Patent Application PCT/JP2009/006681.
Japanese Office Action issued Dec. 4, 2012 in corresponding Japanese Patent Application No. 2008-318108.
Chinese Office Action issued Nov. 28, 2012 in corresponding Chinese Patent Application No. 200980150386.1.
Extended European Search Report issued Apr. 10, 2013 in corresponding European Application No. 09833151.5.
Chinese Office Action issued Apr. 27, 2013 in corresponding Chinese Application No. 200980150386.1.
Japanese Office Action issued Jul. 2, 2013 in corresponding Japanese Application No. 2008-318108.
Chinese Office Action issued Sep. 18, 2013 in corresponding Chinese Patent Application No. 200980150386.1.

* cited by examiner

PRIOR ART

MACHINE COMPONENT AND SUPER-FINISHING METHOD THEREFOR

CROSS REFERENCE TO THE RELATED APPLICATION

This application is a continuation application, under 35 U.S.C §111(a) of international application No. PCT/JP2009/006681, filed Dec. 8, 2009, which claims priority to Japanese patent application No. 2008-318108, filed Dec. 15, 2008, the entire disclosure of which is herein incorporated by reference as a part of this application.

BACKGROUND OF THE INVENTION

1. Field of the Invention

The present invention relates to a machine component, particularly a bearing component such as, for example, a rolling element or an inner or outer bearing ring in a bearing assembly and a superfinishing method for superfinishing the machine component or the bearing component.

2. Description of Related Art

The conventional superfinishing technique is a post machining technique after grinding a work and is carried out with a non-rotatable grindstone oscillated at the work to thereby improve the surface roughness of the work. The Patent Document 1 listed below discloses a machining method in which the use is made of a superfinishing grindstone to form a crowning in a minute protrusion appearing on a surface of a cylindrical rolling element. The Patent Document 2 listed below discloses a method of and an apparatus for superfinishing an outer peripheral surface of a spherical roller that is used in a self-aligning roller bearing assembly. Also, the Patent Documents 3 and 4 listed below disclose a method of or an apparatus for superfinishing a bearing ring, which is either an inner ring or an outer ring used in a roller bearing assembly. In addition, the Patent Document 5 listed below discloses a technique, in which during the manufacture of a self-aligning roller bearing assembly, machining conditions for the formation of an outer ring raceway are set up to thereby suppress friction and heat emission brought about by skew of each of the spherical rollers employed in the bearing assembly.

FIG. 7 illustrates conceptually one example of a manner for superfinishing a peripheral surface of a cylindrical work to be machined with the use of a grindstone. Referring to FIG. 7, while the work 100 to be machined is rotated about its own longitudinal axis in a direction shown by the arrow 100A, the grindstone 101 is worked on the work 100 to traverse in a direction shown by the arrow 101A, which is parallel to the longitudinal axis of the work 100, relative to the work 100 to thereby superfinish the peripheral surface of the work 100.

DOCUMENTS LIST

[Patent Document 1] JP Laid-open Patent Publication No. 2004-174641

[Patent Document 2] JP Laid-open Patent Publication No. 2007-168055

[Patent Document 3] JP Laid-open Patent Publication No. 2007-260829

[Patent Document 4] JP Laid-open Patent Publication No. 2007-260830

[Patent Document 5] JP Laid-open Patent Publication No. 2007-333161

All of the machining methods and/or the machining apparatuses disclosed in the Patent Documents 1 to 5 and the superfinishing method shown in FIG. 7 are such that the movement of the non-rotatable grindstone and the rotation of the work form a fixed angle at all times and a striped pattern, which is called a crossing-angle pattern, is formed on a surface of the work. Also, a superfinishing mechanism cannot follow the crowning shape or the logarithmic shape or a complicated shape such as, for example, a shape depicted by curved lines intertwined and, therefore, it is often that the shape of the work is spoiled. In addition, since the turning radius of the outer periphery of the work changes for each of model numbers, that is, each of product specifications, an undesirable increase of initial set-up steps and a diversification of initial set-up components cannot be avoided, resulting in a problem in terms of the machining efficiency and the production control.

SUMMARY OF THE INVENTION

An object of the present invention is to provide a machine component, a rolling element for a rolling bearing assembly, a bearing ring and a rolling bearing assembly and, also, to provide a machining method therefor, which are effective to render a finished surface to represent a smooth surface free of machined marking of a crossing-angle pattern left thereon and to increase the surface roughness.

The machine component of the present invention has its surface superfinished and the superfinished surface represents a smooth surface free of machined marking of a pattern referred to as a crossing-angle pattern. The machine component is a component forming a part of a machine, an example of which includes a rolling element or a bearing ring for a rolling bearing assembly.

The machine component of the kind referred to above has its superfinished surface which represents a smooth surface free of machined marking such as a crossing-angle pattern left thereon and, therefore, such advantages can be appreciated that the surface roughness can be improved and the improved quality such as, for example, the lifetime extension of the machine component and a counterpart component can be obtained.

In the machine component of the present invention, an outer peripheral surface may be superfinished with a rotating elastic grindstone.

In the case of the construction described above, since the grindstone has an elasticity and works on a to-be-machined surface while it rotates, the smooth surface free of crossing-angle pattern left thereon can be suitably formed. Also, due to the elasticity possessed by the grindstone, superfinishing to a crowning shape or a logarithmic shape or a shape containing curved lines intertwined can be suitably accomplished.

The machine component of the present invention may have an outer peripheral surface and a chamfered portion of an edge of such outer peripheral surface, both of which are superfinished with the rotatable elastic grindstone. This machine component is, for example, a roller shaped rolling element and the outer peripheral surface and the chamfered portion, which is defined in a corner portion between the outer peripheral surface and an end face, both of which are superfinished.

In the case of the construction described above, since the outer peripheral surface and the chamfered portion of the machine component are superfinished with the elastic grindstone, complicated shaped portions over those surfaces can be superfinished with the rotating elastic grindstone to provide the smooth surfaces free of crossing-angle patter left thereon. In particular, since the grindstone has an elasticity, in superfinishing such a complicated shaped portion, that portion can be machined without spoiling the precise shape and the superfinishing of the complicated shaped portion can be favorably carried out.

A rolling element for a rolling bearing assembly, which is one kind of the machine component of the present invention, is a rolling element for the rolling bearing assembly made of steel having its surface superfinished. This rolling element for the rolling bearing assembly has its outer peripheral surface superfinished with the rotating elastic grindstone.

The rolling element for the rolling bearing assembly of the construction described above has a surface roughness that can be improved since the superfinished surface represents a smooth surface free from a machined marking, which is called a crossing-angle pattern, and as a result, an effect to increase the quality such as, for example, an increase of the lifetime of the machine component and a counter component with which the machine component contact can be obtained.

Where the machine component is a rolling element for the rolling bearing assembly, a surface roughness of the rolling element affects the rolling fatigue. If those rolling element surfaces represents a smooth surface free from the machined marking that is called the crossing-angle pattern, the surface roughness can improve and, therefore, the effect of increasing the rolling lifetime of the rolling elements can be obtained, resulting in increase of the lifetime of the bearing assembly.

A bearing ring for the rolling bearing assembly, which is another type of the machine component of the present invention, is a bearing ring for the bearing assembly made of steel having a raceway surface superfinished. This bearing ring for the rolling bearing assembly has the raceway surface superfinished with, for example, the rotating elastic grindstone.

Even with the construction described above, since the raceway surface represents a smooth surface free from the machined marking that is called the crossing-angle pattern and the surface roughness is therefore improved, an effect of increasing the rolling lifetime of the bearing ring can be obtained, resulting in increase of the lifetime of the bearing assembly.

The bearing ring for the rolling bearing assembly according to the present invention may have its raceway surface and peripheral surface portions adjoining opposite sides of the raceway surface, which are superfinished with the rotating elastic grindstone.

In the construction described above, since the raceway surface and the peripheral surface portions adjoining the opposite sides of the raceway surface are superfinished with the elastic grindstone, complicated shaped portions over those surfaces can be superfinished with the rotating elastic grindstone to provide a smooth surfaces free from any crossing-angle patter left thereon. In particular, since the grindstone has an elasticity, in superfinishing such a complicated shaped portion, that portion can be machined without spoiling the precise shape and the superfinishing of the complicated shaped portion can be favorably carried out.

A rolling bearing assembly according to the present invention makes use of the rolling element for the rolling bearing assembly or the bearing ring for the rolling bearing assembly.

A method of machining a machine component according to the present invention makes use of the rotating elastic grindstone to superfinish the machine component. According to the method of the present invention, since the grindstone has an elasticity and works on a surface to be machined while it rotates, a smooth surface free from the crossing-angle pattern can be favorably formed, resulting in increase of the surface roughness.

A superfinishing method for the surface of the rolling element for the rolling bearing assembly or the raceway surface of the bearing ring of the rolling bearing assembly according to the present invention is to superfinish the surface of the rolling element of the rolling bearing assembly or the raceway surface of the bearing ring of the rolling bearing assembly with the use of the rotating elastic grindstone.

As a method of superfinishing a bearing component comprised of a rolling element or a bearing ring of the rolling bearing assembly, a method of superfinishing a to-be-machined surface of a work can be employed, in which a surface shape of a machining surface of the rotating elastic grindstone is rendered to be a sectional shape corresponding to a sectional shape of the to-be-machined surface of the work comprised of a rolling element or a bearing ring for a rolling bearing assembly, which is the bearing component; the work is rotated and the rotating elastic grindstone is urged to an end of the to-be-machined surface of the work; and the elastic grindstone is moved to permit the machining surface of the elastic grindstone, the sectional shape of which corresponds to the sectional shape of the to-be-machined surface, to follow the to-be-machined surface of the work, thereby superfinish the to-be-machined surface of the work.

According to the method of the present invention, while the elastic grindstone has the machining surface of a sectional shape that is proportional or corresponds to the sectional shape of the to-be-machined surface comprised of a rolling element or a bearing ring of a rolling bearing assembly, which is a bearing component, and is rotated, the rotating elastic grindstone is urged to the end of the to-be-machined surface of the work so as to move along the to-be-machined surface of the work. Further, the grindstone has an elasticity and works on the to-be-machined surface while being rotated. For this reason, a smooth surface free from the crossing-angle pattern left thereon is formed and the surface roughness can be improved. In particular, even when the to-be-machined surface is of a shape such as, for example, a crowning shape or a logarithmic shape, or of a complicated shape made up of a combination of curves, machining can be accomplished without the precise shape being spoiled and the superfinishing can be suitably accomplished. Also, since the initial set-up completes only with setting of the widthwise direction of a spindle, which serves as a rotating shaft of the grindstone, and setting of the grindstone shape, the number of initial set-up steps can be reduced. As a result of availability of this technique, the utilization of the general machine tool is made possible and there is no need to newly design the machine, thus accomplishing the labor saving in designing.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
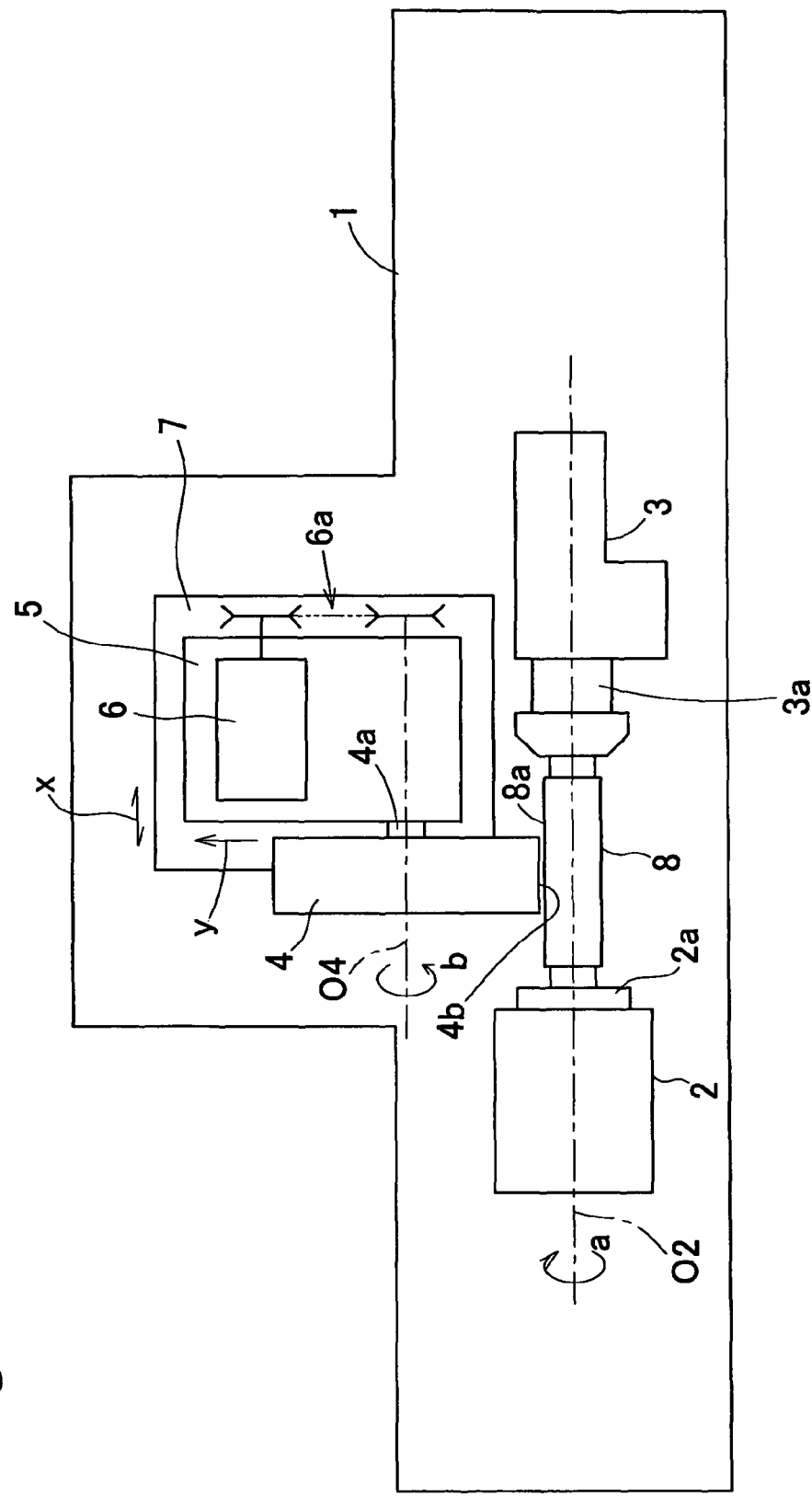
FIG. 1 is a structural diagram conceptually showing a superfinishing apparatus used to execute a superfinishing method according to a first preferred embodiment of the present invention.

One example of a superfinishing apparatus used in the practice of a superfinishing method according to a first preferred embodiment of the present invention will be described in detail with particular reference to FIG. 1. This superfinishing apparatus includes a machine bench 1, a headstock 2 installed on the bench 1 for rotatably supporting a spindle 2a, a tailstock 3 installed on the machine bench 1 for rotatably supporting a tailstock shaft 3a in a coaxial relation with the longitudinal axis O2 of the spindle 2a, and a grindstone support 5 for supporting an elastic grindstone 4 for rotation about a drive axis O4 extending parallel to the spindle longitudinal axis O2. The spindle 2a is driven by a spindle drive motor (not shown) mounted on the machine bench 1 or the headstock 2. A work 8 to be machined is supported between the spindle 2a and the tailstock shaft 3a and is driven about the longitudinal axis O2 together with the spindle 2a. The tailstock 3 itself or the tailstock shaft 3a is adjustably movable in a direction conforming to the spindle longitudinal axis O2.

The elastic grindstone 4 is a superfinishing grindstone of a cylindrical or disc-shaped configuration and is rotatably supported by the grindstone support 5 through a grindstone shaft 4a. The elastic grindstone 4 has an outer peripheral surface representing a machining surface 4b having such a sectional shape as will be described in detail later.

The elastic grindstone 4 is in the form of a grindstone having a higher elasticity than that of the standard grindstone generally used and is made of a material having a Yong's modulus lower than the Young's modulus (10,000 to 50,000 MPa) exhibited by the general resinoid grinding wheel or resinoid grindstone and the general vitrified grinding wheel or vitrified grindstone. While the grindstone is generally prepared from a mixture of abrasive grains with a bonding material used to bond the abrasive particles together, the elastic grindstone 4 of this embodiment is of a composition in which a softer resin than any of vitrified (clay) and resinoid (phenol resin), such as, for example, polyvinyl alcohol or polyurethane is used for the bonding material. More specifically, the elastic grindstone 4 is employed in the form of a grindstone (Young's modulus being within the range of 200 to 5,000 MPa) comprised of abrasive particles, pores and the bonding material prepared by reacting a thermosetting resin with polyvinyl alcohol.

The grindstone support 5 has a motor 6 for driving the grindstone 4 and a drive transmitting mechanism 6a such as, for example, pulleys and an endless belt for transmitting the rotation of the drive motor 6 to the elastic grindstone 4, both of which are mounted thereon. The grindstone support 5 is mounted on a feed table 7 for selective advance or retraction in a direction (y-axis direction) perpendicular to the spindle longitudinal axis O2, which feed table 7 is in turn mounted on the machine bench 1 for selective advance or retraction in a direction (x-axis direction) parallel to the spindle longitudinal axis O2. With the feed table 7 and the grindstone support 5 designed to form a movable table assembly, the elastic grindstone 4 is rendered to be movable in two dimensional planes. Selective advance or retraction of each of the grindstone support 5 and the feed table 7 is accomplished by means of a servomotor (not shown), mounted on the feed table 7 and the machine bench 1, and a rotary-linear motion translating mechanism (not shown) such as, for example, a ball screw for translating the rotary motion of such servomotor into a linear advancing or retracting motion.

The machining method of superfinishing the work 8, made of steel, with the use of the superfinishing apparatus of the structure described above will now be described. At the outset, the work 8 is supported between the spindle 2a and the tailstock shaft 3a. The work 8 shown in FIG. 1 is of a cylindrical in shape or of a disc shape having its outer peripheral surface rendered to be a surface 8a to be machined. The feed table 7 and the grindstone support 5 are moved relative to the work 8 then supported in the manner described above, a machining surface 4b of the elastic grindstone 4 is brought close to the to-be-machined surface 8a of the work 8. While in this condition, the spindle of the headstock 2 is driven in the direction shown by the arrow a and, on the other hand, the elastic grindstone 4 is driven in a direction counter to the direction of rotation of the spindle 2a, shown by the arrow b.

While the machining surface 4b of the elastic grindstone 4 is urged towards the to-be-machined surface 8a, the grindstone support 5 and the feed table 7 are moved so as to permit the machining surface 4b to depict a machining trajectory as will be detailed later, with the grindstone 4 superfinishing the to-be-machined surface 8a of the work 8. If the sectional shape of the machining surface 4b of the elastic grindstone 4 is properly selected to suit to the shape of the work 8, works 8 of various shapes can be superfinished.

Figure 2:
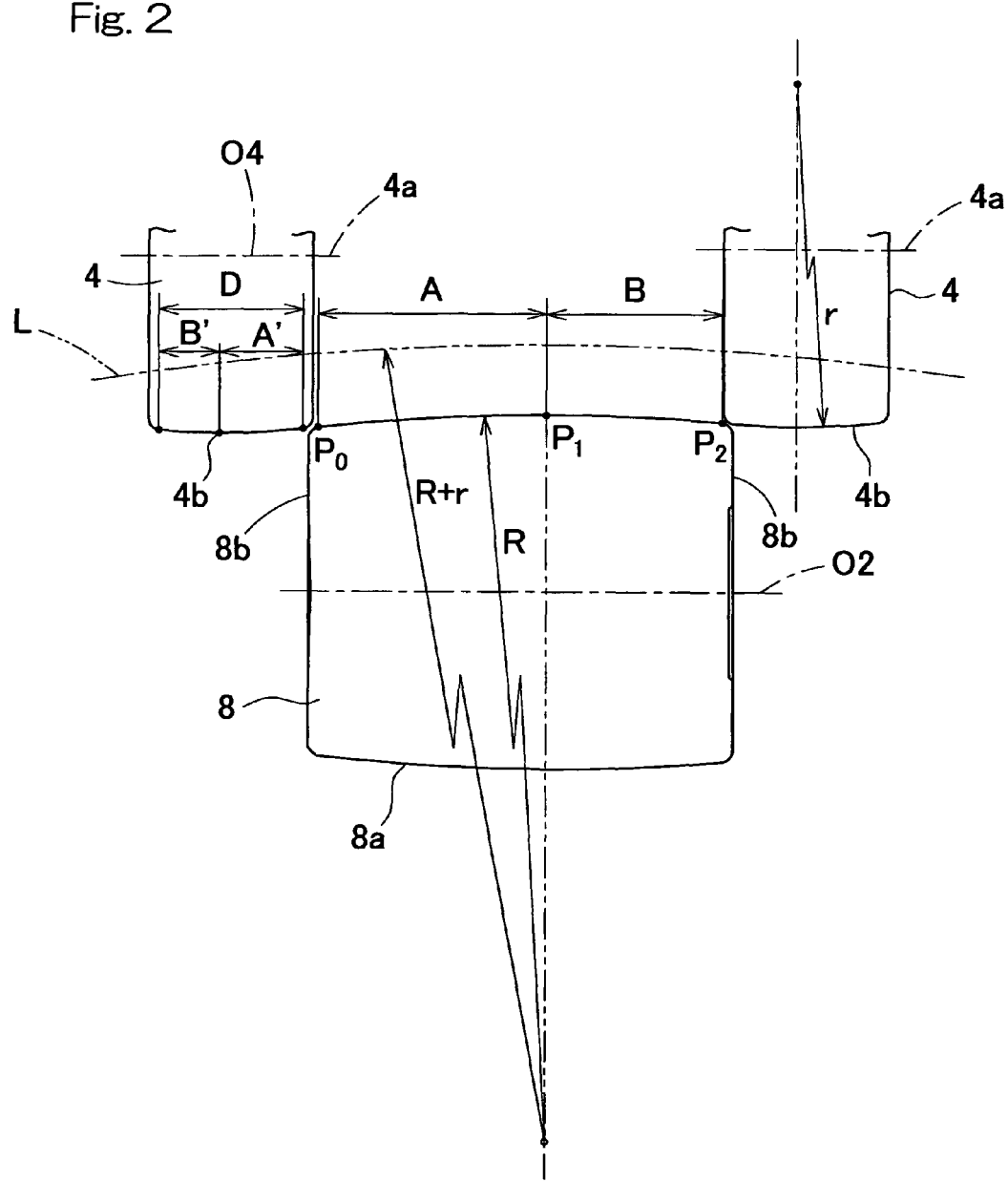
FIG. 2 is a diagram showing the relationship between the shape of a work to be machined, the shape of an elastic grindstone and a machined marking left by the elastic grindstone in the practice of the superfinishing method according to the first embodiment of the present invention.

With respect to the work 8 having a single curvature, the relation between the shape of the work 8 and the shape of the elastic grindstone 4 and an example of calculation of the machining trajectory of the elastic grindstone 4 will now be discussed. The work 8 in FIG. 2 is a rolling bearing assembly made of steel, more specifically a cylindrical roller of an asymmetrical shape used in a roller bearing assembly, in which the process has completed up to the preceding processing step such as, for example, a grinding or turning prior to the finishing process. Of an outer peripheral surface 8a and opposite end faces 8b and 8b, which are surfaces of the work 8, the outer peripheral surface, which defines the to-be-machined surface 8a in the example now under discussion, is asymmetrical in an axial direction with respect to the maximum diameter position $P_1$, but as a whole, represents a crowning shape of an arcuate shape having the single curvature. Symbols $P_0$ and $P_2$ in FIG. 2 represent respective axial positions of opposite ends of the entire arcuate surface region of the to-be-machined surface 8a.

(1) In the first place, the respective distances of the opposite arcuate surface regions $P_0$-$P_1$ and $P_1$-$P_2$ relative to the maximum diameter position $P_1$ are calculated from design parameters of a rolling bearing assembly applied.

(2) The distance between $P_0$-$P_1$ is designated by A and the distance between $P_1$-$P_2$ is designated by B.

(3) An effective width D of the machining surface 4b in the elastic grindstone 4 is arbitrarily chosen. The machining surface 4b is of an arcuate sectioned shape.

(4) Distances B' and A' of the machining surface region, which defines opposite side portions of the maximum diameter position, in the effective width D of the machining surface 4b of the elastic grindstone 4 are calculated. At this time, calculation is performed so that the ratio between the distances B and A of the work 8 matches with the ratio B':A' between the distances A and B of the machining surface region.

That is:

$$A'=(A \times D)/(A+B)$$

$$B'=(B \times D)/(A+B)$$

(5) Using the radius of curvature of the to-be-machined surface 8a as R and the radius of curvature of the machining surface 4b of the elastic grindstone 4 as r, the radius r is adjusted so that the following calculation is performed:

$$r=(R \times D)/(A+B)$$

(6) The sum (equivalent circle) R+r of the radius R of the work 8 and the radius r of the elastic grindstone 4 is rendered to be the radius of the arcuate path along which the elastic grindstone 4 is moved, that is, the radius of the machining trajectory L.

(7) Using the elastic grindstone 4 having the machining surface 4b so determined as hereinabove described, while the elastic grindstone 4 is driven, the elastic grindstone 4 is moved along the arcuate machining trajectory L to perform the superfinishing.

The process described under (7) above will now be described. While the machining surface 4b of the elastic grindstone 4 rotatable about the drive axis O4 is engaged with the to-be-machined surface 8a of the work 8 then rotating about the spindle longitudinal axis O2, the elastic grindstone 4 is moved from one end of the to-be-machined surface 8a so as to depict the arcuate machining trajectory L, thereby superfinishing the to-be-machined surface 8a. The movement of the elastic grindstone 4 so as to depict the arcuate machining trajectory L is accomplished through composite movements of the grindstone support 5 and the feed table 7. The radius of curvature of the machining trajectory L is rendered to be the sum (equivalent circle) R+r of the radius R of curvature of the to-be-machined surface 8a of the work 8 and the radius r of curvature of the machining surface 4b of the elastic grindstone 4, which has been calculated in the manner as hereinbefore described. The machining trajectory L and an operational program for each operational pattern of the grindstone support 5 and the feed table 7 based on the machining trajectory L are stored in, for example, a numerical control device (not shown) and are executed thereby.

As hereinabove described, when the elastic grindstone 4 being then driven about the drive axis O4, is traversed repeatedly along the machining trajectory L to work on the to-be-machined surface 8a of the work 8, a spherical surface of a single curvature of $P_0$-$P_1$-$P_2$ as shown in FIG. 2 can be superfinished. Since this superfinishing is accomplished through the composite movements including the rotation of the work 8, the rotation of the elastic grindstone 4 and the traversing movement of the elastic grindstone 4, the spherical surface that is superfinished represents a smooth surface free from a machined marking such as a pattern that is called a crossing-angle pattern. For this reason, the surface roughness can be improved.

It is to be noted that although in FIG. 2 the elastic grindstone 4 is depicted at two locations, this is merely illustrative of the traversing movement of the elastic grindstone 4 along the machining trajectory L between those two locations.

Figure 3:
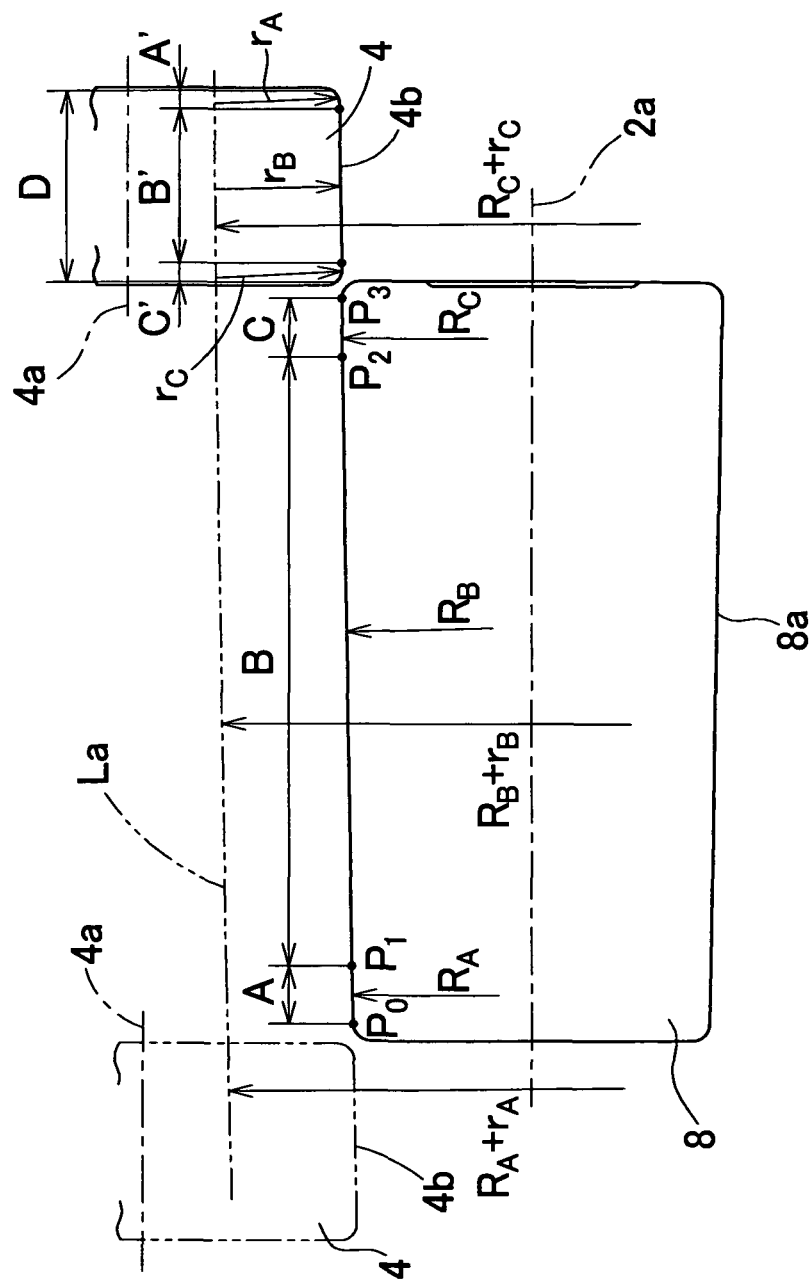
FIG. 3 is a diagram showing the relationship between the shape of the work, the shape of the elastic grindstone and the machined marking left by the elastic grindstone in the practice of the superfinishing method according to a second preferred embodiment of the present invention.

FIG. 3 illustrates the superfinishing method according to a second preferred embodiment of the present invention, which is applicable to the work 8 of a kind having a plurality of shapes. The work 8 shown therein is a rolling element for a rolling bearing assembly made of steel, more specifically a tapered roller for a tapered roller bearing assembly and the sectional shape of the outer peripheral surface which defines the to-be-machined surface 8a includes an intermediate arcuate surface region (a portion of an axial distance B) of a radius $R_B$ and end arcuate surface regions (portions of axial distances A and C) of respective radii $R_A$ and $R_C$ on the opposite sides thereof, all of which are continued together. The relation between the shape of the work 8 and the shape of the elastic grindstone 4 and an example of calculation of the machining trajectory of the elastic grindstone 4 in this case will now be discussed.

(1) The distance of one of the end arcuate surface regions (between $P_0$-$P_1$), the distance of the intermediate arcuate surface region (between $P_1$-$P_2$) and the distance of the other of the end arcuate surface regions (between $P_2$-$P_3$) are calculated from design parameters of a rolling bearing assembly applied.

(2) The distance between $P_0$-$P_1$ is designated by A, the distance between $P_1$-$P_2$ is designated by B and the distance between $P_2$-$P_3$ is designated by C.

(3) An effective width D of the machining surface 4b in the elastic grindstone 4 is arbitrarily chosen.

(4) Within the effective width D of the machining surface 4b of the elastic grindstone 4, the axial lengths A', B' and C' of respective machining surface regions at one of the opposite ends, an intermediate portion and the other of the opposite ends, which will become corresponding arcuate sectioned portions of the machining surface 4b, are calculated. The three machining surface regions form respective arcuate surface regions having radii of curvature different from each other. Those lengths are adjusted such that the ratio A:B:C of the arcuate surface regions of the to-be-machined surface 8a of the work 8 matches with the ratio A':B':C' of the machining surface regions.

That is:

$$A'=(A \times D)/(A+B+C)$$

$$B'=(B \times D)/(A+B+C)$$

$$C'=(C+D)/(A+B+C)$$

(5) Using the radius of curvature of the to-be-machined surface 8a as R and the radius of curvature of the machining surface 4b of the elastic grindstone 4 as r, the radius r is adjusted so that the following calculation is performed with respect to the corresponding curvature portions:

$$r=(R \times D)/(A+B)$$

Assuming that the radii of curvatures of the respective arcuate surface regions having the corresponding radii of curvature of the work 8 are expressed by $R_A$, $R_B$ and $R_C$, the respective radii of curvature $r_A$, $r_B$ and $r_C$ of the machining surface regions (regions of the distances A', B' and C') of the machining surface 4b of the elastic grindstone 4 are calculated as follows:

$$r_A=(R_A \times D)/(A+B+C)$$

$$r_B=(R_B \times D)/(A+B+C)$$

$$r_C=(R_C \times D)/(A+B+C)$$

(6) The sum (equivalent circle) $R_A+r_A$, $R_B+r_B$, $R_C+r_C$ of the respective radius $R_A$, $R_B$, $R_C$ of the work 8 and the respective radius $r_A$, $r_B$, $r_C$ of the elastic grindstone 4 is rendered to be the radius of each arcuate path along which the elastic grindstone 4 is moved, that is, the radius of each portion of the machining trajectory La.

(7) Using the elastic grindstone 4 having the machining surface 4b so determined as hereinabove described, while the elastic grindstone 4 is driven, the elastic grindstone 4 is moved along the arcuate machining trajectory La to perform the superfinishing.

The process described under (7) above will now be described. While the machining surface 4b of the elastic grindstone 4 rotatable about the drive axis O4 is engaged with the to-be-machined surface 8a of the work 8 then rotating about the spindle longitudinal axis O2, the elastic grindstone 4 is moved from one end of the to-be-machined surface 8a so as to depict the arcuate machining trajectory La of the radius of curvature for each of the machining surface regions, thereby superfinishing the to-be-machined surface 8a.

This machining trajectory La is made up of three regions compounded and the radius of curvature of the first region is rendered to be the sum (equivalent circle) $R_A+r_A$ of the radius $R_A$ of curvature of the curved surface region A in the to-be-machined surface 8a and the radius of curvature $r_A$ of the corresponding machining surface region in the machining surface 4b of the elastic grindstone 4. The radius of curvature of the second region is rendered to be the sum (equivalent circle) $R_B+r_B$ of the radius $R_B$ of curvature of the curved surface region B and the radius $r_B$ of curvature of the machining surface region. The radius of curvature of the third region is rendered to be the sum (equivalent circle) $R_C+r_C$ of the radius $R_C$ of curvature of the curved surface region C and the radius $r_C$ of curvature of the machining surface region.

As hereinabove described, when the elastic grindstone 4 being then driven about the drive axis O4 is traversed repeatedly along the machining trajectory La to work on the to-be-machined surface 8a of the work 8, a curved surface of a shape made up of the plural shapes of $P_0$-$P_1$-$P_2$-$P_3$ as shown in FIG. 3 can be superfinished. Since even this superfinishing is accomplished through the composite movements including the rotation of the work 8, the rotation of the elastic grindstone 4 and the traversing movement of the elastic grindstone 4, the curved surface that is superfinished represents a smooth surface free from a machined marking such as a pattern that is called a crossing-angle pattern. For this reason, the surface roughness can be improved.

Figure 4:
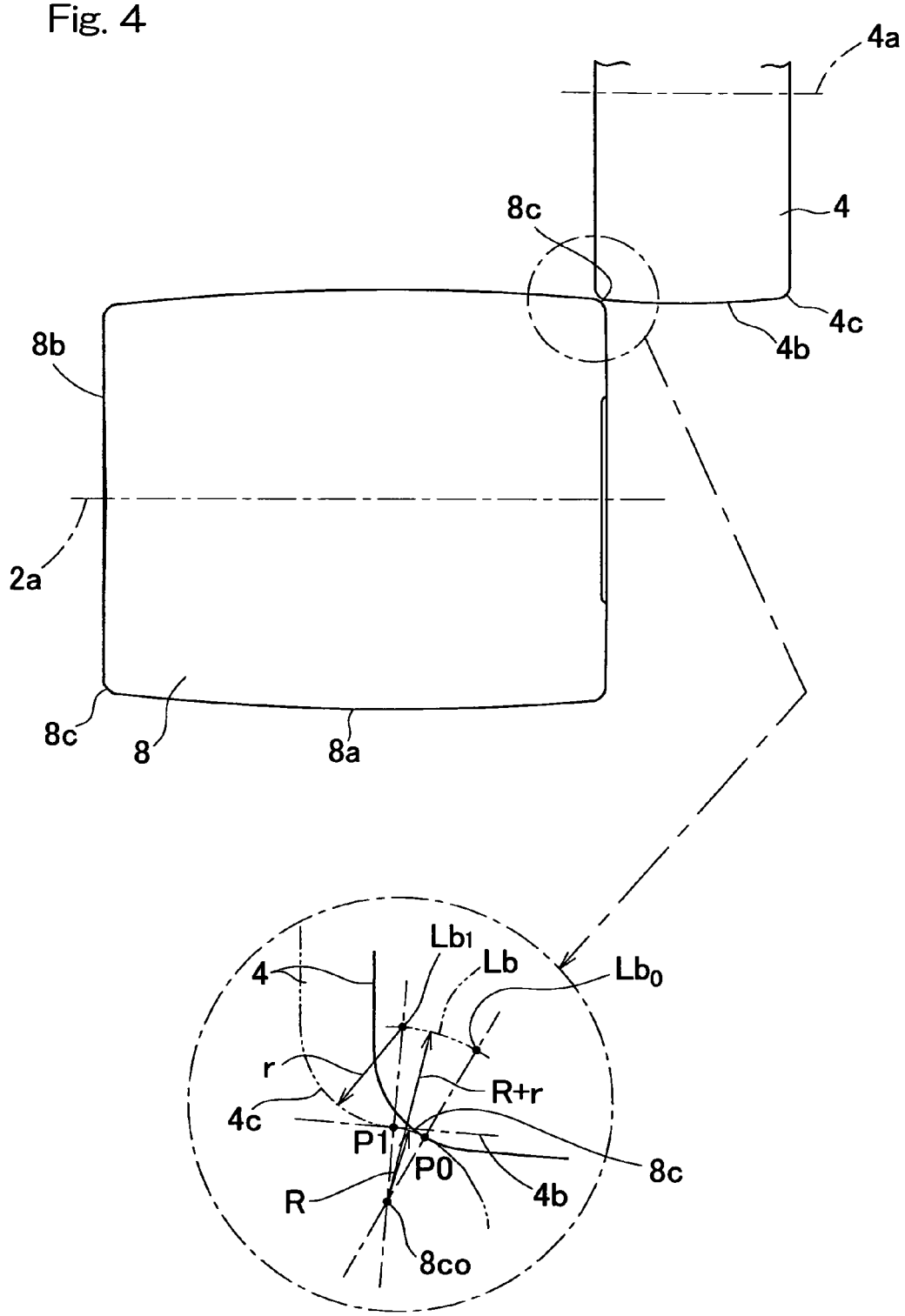
FIG. 4 is a diagram showing the relationship between the shape of the work, the shape of the elastic grindstone and the machined marking left by the elastic grindstone in the practice of the superfinishing method according to a third preferred embodiment of the present invention.

The superfinishing method according to a third preferred embodiment of the present invention, in which a chamfered portion is machined, will now be described with particular reference to FIG. 4. FIG. 4 illustrates a condition in which a chamfered portion 8c defined at a corner area between the outer peripheral surface 8a and an end face 8b of the work 8, which is a rolling elements for the bearing assembly, that is, a tapered roller shown in FIG. 2, is being superfinished.

(1) In the first place, the radius R of arc that connects opposite ends (axial positions P0-P1) of a region of the chamfered portion 8c of the work 8, which is to be superfinished, is calculated.

(2) The arc radius r of an end arcuate portion 4c of the elastic grindstone 4, which represents an arcuate sectioned shape, is arbitrarily chosen.

(3) The arc of a radius R+r is depicted from the center 8co of curvature of the chamfered portion 8c in the work 8.

(4) The curvature center 8co of the chamfered portion 8c in the work 8 and the opposite ends P0 and P1 of a portion desired to be machined are connected with respective lines.

(5) Points $Lb_0$ and $Lb_1$ of the arc of the radius R+r, which intersects each of the respective lines, are rendered to represent an operational range of the elastic grindstone 4. In other words, a portion between the intersection points $Lb_0$ and $Lb_1$ of the arc of the radius R+r is rendered to be a machining trajectory Lb.

(6) Using the elastic grindstone 4 as described above, since the elastic grindstone 4, while being driven, is moved along the machining trajectory Lb, the chamfered portion 8c is superfinished.

The process described under (6) above will now be described. While the end arcuate portion 4c of the elastic grindstone 4 rotatable about the drive axis O4 is engaged with the chamfered portion 8c of the work 8 then rotating about the spindle longitudinal axis O2, the grindstone support 5 and the feed table 7 are actuated to operate the elastic grindstone 4 so as to depict the machining trajectory Lb to thereby superfinish the chamfered portion 8c. In a portion of the drawing of FIG. 4 shown on an enlarged scale, two elastic grindstones 4 are depicted, but this indicates that the elastic grindstones 4 are held at respective positions corresponding to the intersection points $Lb_0$ and $Lb_1$.

As hereinabove described, when the elastic grindstone 4 being then driven about the drive axis O4 is traversed repeatedly between the intersection points $Lb_0$ and $Lb_1$ along the machining trajectory Lb to work on the chamfered portion 8c of the work 8, the chamfered portion 8c in the interval P0-P1 as shown in FIG. 4 can be superfinished, and as a result, this machined surface represents a smooth surface free from a machined marking such as a pattern that is called a crossing-angle pattern.

Figure 5:
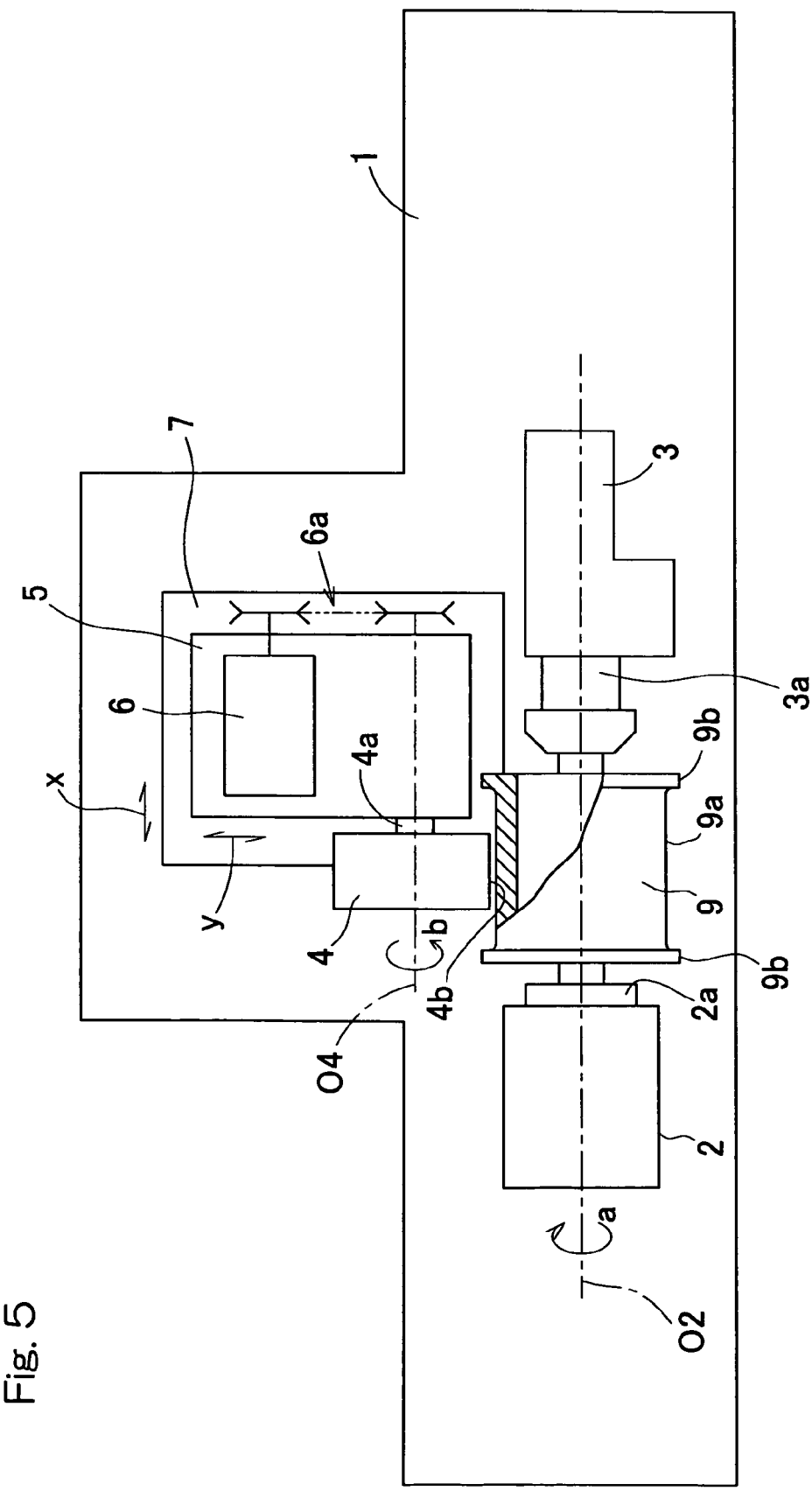
FIG. 5 is a diagram similar to FIG. 1, showing a condition in which a different work is superfinished with the use of the superfinishing apparatus shown in FIG. 1.

FIG. 5 illustrates a condition in which with the use of the superfinishing apparatus shown in FIG. 1, a raceway surface of a bearing ring for a rolling bearing assembly and a peripheral portion of the raceway surface adjoining opposite sides of the raceway surface, which raceway surface and peripheral portion thereof are used as a work, are being superfinished. The bearing ring 9 for the rolling bearing assembly is an inner ring for use in a single row tapered roller bearing assembly, which has both ends formed with a collar. This inner ring (work) 9 is of a hollow cylindrical shape having its outer peripheral surface rendered to be a raceway surface 9a, and a peripheral surface region including the collars 9b at the opposite ends of this raceway surface 9a is also rendered to be the to-be-machined surface. As is the case as hereinbefore described, this work 9 is supported between the spindle 2a and the tailstock shaft 3a. Then, with the grindstone support 5 and feed table 7 moved, the machining surface 4b of the elastic grindstone 4 is approached to the to-be-machined surface (including the peripheral portion on both sides) 9a of the work 9. In this condition, the spindle 2a is driven in the direction shown by the arrow a and the elastic grindstone 4 is also driven in a direction reverse to the direction of rotation of the spindle 2a as shown by the arrow b. While the machining surface 4b of the elastic grindstone 4 is engaged with the to-be-machined surface 9a of the work 9, the grindstone support 5 and the feed table 7 are so moved as to allow the machining surface 4b of the elastic grindstone 4 to depict a predetermined machining trajectory, thereby superfinishing the to-be-machined surface 9a of the work 9.

Even in this case, the elastic grindstone 4 is selected to suit to the shape of the work 9 and is then fitted to a drive unit thereof. Also, the machining trajectory of the elastic grindstone 4 is calculated in a manner similar to that described hereinbefore and the respective operational patterns of the grindstone support 5 and the feed table 7 are set up so as to follow the calculated machining trajectory. The to-be-machined surface 9a of the 9 so superfinished in the manner described above is rendered to be a smooth surface free from the crossing-angle pattern left thereon. In particular, although the bearing ring such as an inner ring or an outer ring generally has a crowning shape or a logarithmic shape, or a complicated shape made up of a combination of curves, the machining to accommodate such a shape is possible and, accordingly, the surface roughness can be improved without the shape being spoiled.

It is to be noted that although the superfinishing process applied to the outer ring requires a different mounting of a machining work to the spindle 2a and a different manner of the elastic grindstone 4 working on the raceway surface from those described in connection with the inner ring, it can be practiced in a manner similar to that described hereinbefore.

Figure 6:
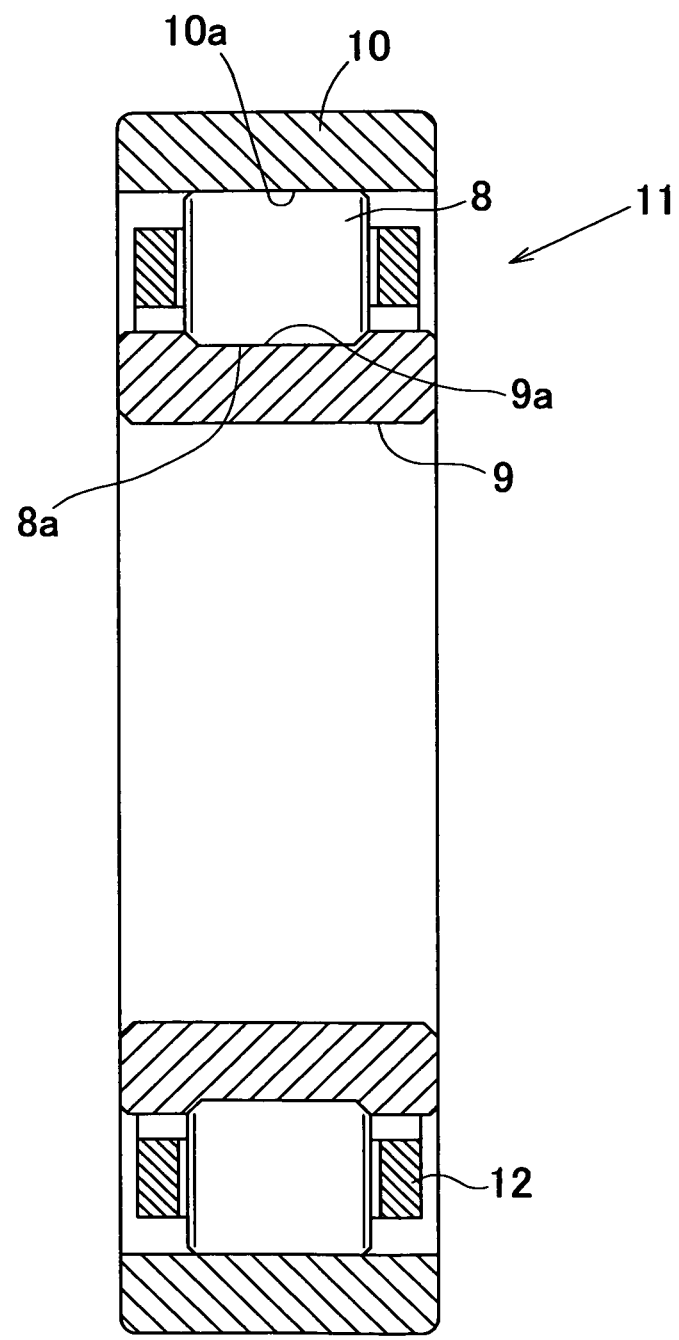
FIG. 6 is a sectional view showing one example of a roller bearing assembly assembled with the use of bearing components pertaining to any one of the first to third embodiments of the present invention.
Figure 7:
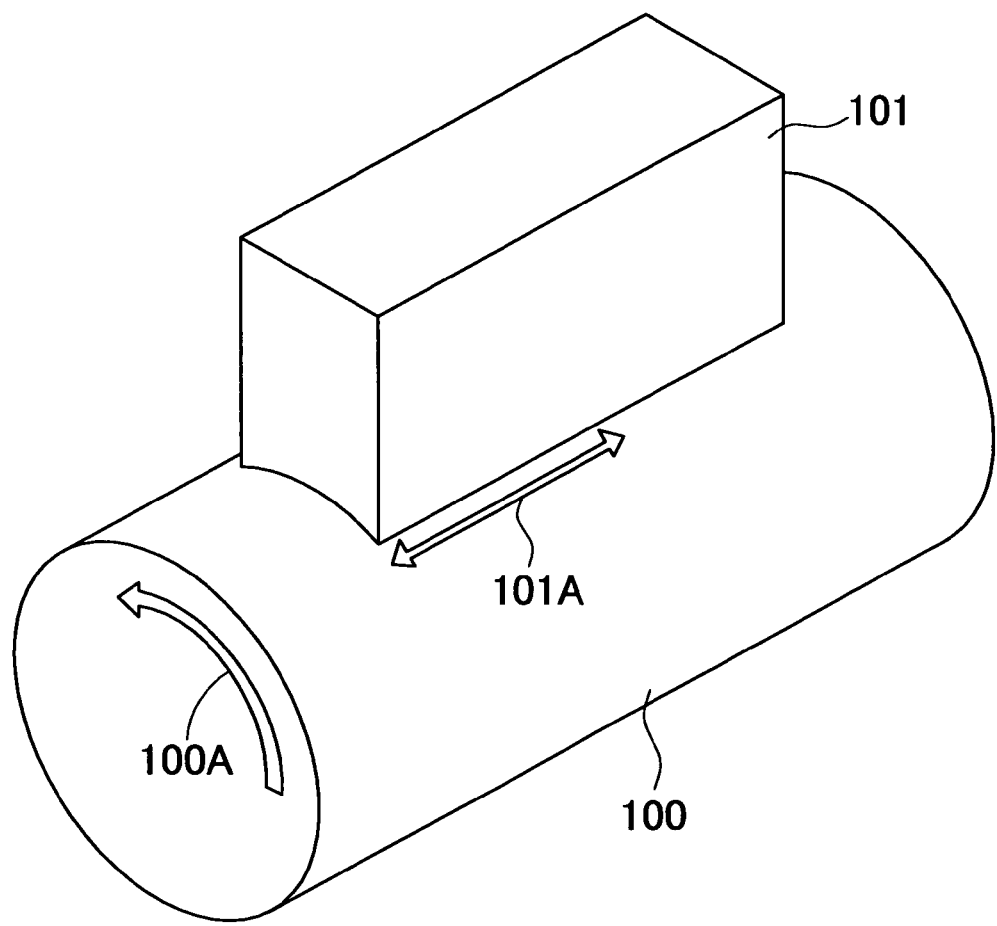
FIG. 7 is a conceptual perspective view showing the conventional superfinishing manner.

FIG. 6 schematically illustrates a single row rolling bearing assembly 11 assembled with the use of bearing components (rolling elements 8, an inner ring 9 and an outer ring 10) all of which have been superfinished in the manner shown in and described in connection with any one of the first to third embodiments of the present invention. This illustrated rolling bearing assembly 11 is in the form of a roller bearing assembly, and an outer peripheral surface 8a of each of cylindrical rollers (works) 8 which are the rolling elements, an outer peripheral surface (raceway surface) 9a of the inner ring 9 which is one of the bearing rings, and an inner peripheral surface (raceway surface) 10a of the outer ring 10 which is the other of the bearing rings have been superfinished as the to-be-machined surfaces according to the previously described superfinishing method. The roller bearing assembly 11 having those bearing components 8, 9 and 10 and a retainer 12 for the rolling elements 8 incorporated therein is such that since the to-be-machined surfaces 8a, 9a and 10a, which rollingly contact with each other, are rendered to be respective smooth surfaces free from the crossing-angle patterns, the surface roughness is increased and, accordingly, the rolling fatigue life of the rolling bearing assembly ensures a long lifetime.

As hereinbefore fully described in connection with the various examples shown in FIGS. 2 to 6, using the elastic grindstone 4, the sectional shape of the machining surface 4a of the elastic grindstone 4 and machining trajectory L, La and Lb are so chosen as to suit to the sectional shape of the to-be-machined surface 8a and, therefore, the following various advantages can be appreciated.

(1) The smooth surface free from the crossing-angle pattern left thereon can be obtained and the surface roughness can be increased.

(2) Whereas with the conventional superfinishing technique, it cannot suit to the complicated shape and the shape of the work tends to be spoiled, the foregoing various embodiments of the present invention makes it possible to accomplish machining of the crowning shape or any other complicated shape such as, for example, the shape made up of a plurality of curves.

(3) Superfinishing to the chamfered portion can be accomplished.

(4) Since the initial set-up completes only with setting of the work 8 and change of the grindstone shape, it is possible to reduce the number of initial set-up steps.

(5) Since machining is possible with the use of a finishing machine such as, for example, the general grinding machine, there is no need to newly design the machine and labor-saving can be realized in designing.

It is to be noted that although the roller bearing assembly 11 shown in FIG. 6 is a single row cylindrical roller bearing assembly, it may be a multi-row cylindrical roller bearing assembly, a needle roller bearing assembly, a single or multi-row tapered roller bearing assembly or a self-aligning roller bearing assembly. Even in those bearing assemblies, when the shape of the elastic grindstone 4 and the machining trajectory of the elastic grindstone 4 are properly designed and configured to suit to the shape of each of those bearing components, the to-be-machined surface of each of those bearing components can be rendered to be a smooth surface free from the crossing-angle pattern and, therefore, the surface roughness increase and effects similar to those described hereinbefore can be equally obtained.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

4 . . . Elastic grindstone
4a . . . Grindstone shaft
4b . . . Machining surface
8 . . . Rolling element (Bearing component, Work)
8a . . . Outer peripheral surface (To-be-machined surface)
8b . . . End face
8c . . . Chamfered portion (To-be-machined surface)
9 . . . Bearing ring (Inner ring, Bearing component, Work)
9a . . . Raceway surface (To-be-machined surface)
10 . . . Bearing ring (Outer ring Bearing component, Work)
10a . . . Raceway surface (To-be-machined surface)
11 . . . Rolling bearing assembly

What is claimed is:

1. A machine component comprising a superfinished surface, the superfinished surface being formed by a rotating elastic grindstone, the rotating elastic grindstone being rotated in a direction counter to a direction of rotation of the machine component, whereby the superfinished surface does not include machined markings and crossing-angle patterns, wherein the superfinished surface is an outer peripheral surface and a chamfered portion of an edge of the outer peripheral surface of the machine component.

2. The machine component as claimed in claim 1, wherein the machine component is a rolling element for a rolling bearing assembly which is made of steel.

3. The machine component as claimed in claim 2, wherein the rolling element is a roller shaped rolling element, and
a chamfered portion is provided in a corner portion between the outer peripheral surface and an end face of the roller shaped rolling element.

4. A rolling bearing assembly utilizing the rolling element for the rolling bearing assembly as defined in claim 2.

5. The machine component as claimed in claim 1, wherein the machine component is a bearing ring for a rolling bearing assembly which is made of steel, a raceway surface of the bearing ring being the superfinished surface.

6. The machine component as claimed in claim 5, wherein the superfinished surface further includes periphery surface portions adjoining opposite sides of the raceway surface.

7. A rolling bearing assembly utilizing the bearing ring for the rolling bearing assembly as defined in claim 5.

8. The machine component as claimed in claim 1, in which a rotational axis of the elastic grindstone extends parallel to a rotational axis of the machine component.

9. A superfinishing method comprising:
- superfinishing a machine component with a rotating elastic grindstone, the rotating elastic grindstone being rotated in a direction counter to a direction of rotation of the machine component, the machine component being a bearing component;
- rendering a surface shape of a machining surface of the rotating elastic grindstone to be a sectional shape corresponding to a sectional shape of a to-be-machined surface of a work comprised of a rolling element or a bearing ring for a rolling bearing assembly, which is the bearing component;
- rotating the work and urging the rotating elastic grindstone to an end of the to-be-machined surface of the work; and
- moving the elastic grindstone to permit the machining surface of the elastic grindstone, the sectional shape of which corresponds to the sectional shape of the to-be-machined surface, to follow the to-be-machined surface of the work,
- whereby the to-be-machined surface of the work is therefore superfinished.

10. The superfinishing method as claimed in claim 9, in which the machine component is a rolling element for a rolling bearing assembly and a surface of the rolling element is superfinished.

11. The superfinishing method as claimed in claim 9, in which the machine component is a bearing ring for a rolling bearing assembly and a raceway surface of the bearing ring is superfinished.

12. The superfinishing method as claimed in claim 9, in which a rotational axis of the elastic grindstone extends parallel to a rotational axis of the machine component.

13. The superfinishing method as claimed in claim 9, wherein the Young's modulus of the elastic grindstone is within the range of 200 to 5,000 MPa.

\* \* \* \* \*